(12) United States Patent
Zhang et al.

(10) Patent No.: US 7,870,114 B2
(45) Date of Patent: Jan. 11, 2011

(54) EFFICIENT DATA INFRASTRUCTURE FOR HIGH DIMENSIONAL DATA ANALYSIS

(75) Inventors: Haidong Zhang, Beijing (CN); Guowei Liu, Beijing (CN); Yantao Li, Beijing (CN); Bing Sun, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 385 days.

(21) Appl. No.: 11/818,879

(22) Filed: Jun. 15, 2007

(65) Prior Publication Data

US 2008/0313213 A1  Dec. 18, 2008

(51) Int. Cl.
    G06F 17/30  (2006.01)
(52) U.S. Cl. .................. 707/705; 707/736; 707/741; 707/742
(58) Field of Classification Search .............. 707/104.1, 707/10, 101, 736, 741, 742, 756
    See application file for complete search history.

(56) References Cited

U.S. PATENT DOCUMENTS

| | | | |
|---|---|---|---|
| 4,068,298 A | 1/1978 | Dechant et al. | |
| 5,500,941 A | 3/1996 | Gil | |
| 5,542,070 A | 7/1996 | LeBlanc et al. | |
| 5,548,718 A | 8/1996 | Siegel et al. | |
| 5,619,709 A * | 4/1997 | Caid et al. | 715/209 |
| 5,774,660 A | 6/1998 | Brendel et al. | |
| 5,867,144 A | 2/1999 | Wyard | |
| 5,903,886 A | 5/1999 | Heimlich et al. | |
| 5,956,720 A | 9/1999 | Fernandez et al. | |
| 6,046,741 A | 4/2000 | Hochmuth | |
| 6,079,032 A | 6/2000 | Peri | |
| 6,128,279 A | 10/2000 | O'Neil et al. | |
| 6,131,082 A | 10/2000 | Hargrave, III et al. | |
| 6,138,159 A | 10/2000 | Phaal | |
| 6,144,962 A | 11/2000 | Weinberg et al. | |

(Continued)

FOREIGN PATENT DOCUMENTS

EP  1083486  3/2001

(Continued)

OTHER PUBLICATIONS

Shah Biren N., "On Improving Information Retrieval performance from Structured, Semistructured and Un-structured Information Sources", University of Louisiana at Lafayette, 2005.

(Continued)

*Primary Examiner*—Jean M Corrielus (57) ABSTRACT

Described is a technology by which high dimensional source data corresponding to rows of records with identifiers, and columns comprising dimensions of data values, are processed into a file model for efficient access. An inverted index corresponding to any dimension is built by mapping data from raw dimension values to mapped values based on mapping entries in a dimension table. The record identifiers are arranged into subgroups based on their mapped value; a count and/or an offset may be maintained for locating each of the subgroups. The raw values for a dimension are maintained within a raw value file. For sparse data, the raw value file may be compressed, e.g., by excluding nulls and associating a record identifier with each non-null. A data manager provides access to data in the data files, such as by offering various functions, using caching for efficiency.

20 Claims, 8 Drawing Sheets

U.S. PATENT DOCUMENTS

| | | | |
|---|---|---|---|
| 6,154,746 | A | 11/2000 | Berchtold et al. |
| 6,167,358 | A | 12/2000 | Othmer et al. |
| 6,182,139 | B1 | 1/2001 | Brendel |
| 6,233,570 | B1 | 5/2001 | Horvitz et al. |
| 6,237,138 | B1 | 5/2001 | Hameluck et al. |
| 6,237,143 | B1 | 5/2001 | Fontana et al. |
| 6,260,050 | B1 | 7/2001 | Yost et al. |
| 6,317,750 | B1 | 11/2001 | Tortolani et al. |
| 6,374,369 | B1 | 4/2002 | O'Donnell |
| 6,385,604 | B1 * | 5/2002 | Bakalash et al. ............... 707/3 |
| 6,418,427 | B1 | 7/2002 | Egilsson et al. |
| 6,434,544 | B1 | 8/2002 | Bakalash et al. |
| 6,564,174 | B1 | 5/2003 | Ding et al. |
| 6,567,796 | B1 | 5/2003 | Yost et al. |
| 6,587,970 | B1 | 7/2003 | Wang et al. |
| 6,601,062 | B1 | 7/2003 | Deshpande et al. |
| 6,633,782 | B1 | 10/2003 | Schleiss et al. |
| 6,662,362 | B1 | 12/2003 | Arora et al. |
| 6,701,363 | B1 | 3/2004 | Chiu et al. |
| 6,714,940 | B2 | 3/2004 | Kelkar |
| 6,748,555 | B1 | 6/2004 | Teegan et al. |
| 6,754,312 | B1 | 6/2004 | Gundlach |
| 6,768,986 | B2 | 7/2004 | Cras et al. |
| 6,801,940 | B1 | 10/2004 | Moran et al. |
| 6,816,898 | B1 | 11/2004 | Scarpelli et al. |
| 6,845,474 | B2 | 1/2005 | Circenis et al. |
| 6,862,696 | B1 | 3/2005 | Voas et al. |
| 6,901,347 | B1 | 5/2005 | Murray et al. |
| 6,901,536 | B2 | 5/2005 | Davenport |
| 6,912,692 | B1 | 6/2005 | Pappas |
| 6,963,826 | B2 | 11/2005 | Hanaman et al. |
| 7,003,766 | B1 | 2/2006 | Hong |
| 7,028,225 | B2 | 4/2006 | Maso et al. |
| 7,032,214 | B1 | 4/2006 | Rodrigues et al. |
| 7,039,166 | B1 | 5/2006 | Peterson et al. |
| 7,062,483 | B2 | 6/2006 | Ferrari et al. |
| 7,080,091 | B2 | 7/2006 | Matsuda |
| 7,111,282 | B2 | 9/2006 | Stephenson |
| 7,117,208 | B2 | 10/2006 | Tamayo et al. |
| 7,131,070 | B1 | 10/2006 | Motoyama et al. |
| 7,171,406 | B2 | 1/2007 | Chen et al. |
| 7,185,231 | B2 | 2/2007 | Mullally et al. |
| 7,194,386 | B1 | 3/2007 | Parikh et al. |
| 7,197,447 | B2 | 3/2007 | Susskind |
| 7,216,341 | B2 | 5/2007 | Guarraci |
| 7,315,849 | B2 * | 1/2008 | Bakalash et al. ............... 707/2 |
| 7,333,982 | B2 * | 2/2008 | Bakalash et al. ............... 707/5 |
| 7,392,248 | B2 * | 6/2008 | Bakalash et al. ............... 707/5 |
| 7,401,331 | B2 | 7/2008 | Leung |
| 7,627,564 | B2 | 12/2009 | Yao et al. |
| 2001/0044705 | A1 | 11/2001 | Vardi et al. |
| 2002/0083003 | A1 | 6/2002 | Halliday et al. |
| 2002/0144124 | A1 | 10/2002 | Remer et al. |
| 2003/0009507 | A1 | 1/2003 | Shum |
| 2003/0115207 | A1 | 6/2003 | Bowman et al. |
| 2004/0049505 | A1 | 3/2004 | Pennock |
| 2004/0088699 | A1 | 5/2004 | Suresh |
| 2004/0117760 | A1 | 6/2004 | McFarling |
| 2004/0122646 | A1 | 6/2004 | Colossi et al. |
| 2004/0133882 | A1 | 7/2004 | Angel et al. |
| 2004/0191743 | A1 | 9/2004 | Chiu et al. |
| 2004/0193576 | A1 | 9/2004 | Petculescu et al. |
| 2004/0230858 | A1 | 11/2004 | Susskind |
| 2005/0015683 | A1 | 1/2005 | Clark et al. |
| 2005/0021293 | A1 | 1/2005 | Elbel et al. |
| 2005/0065910 | A1 | 3/2005 | Welton et al. |
| 2005/0065940 | A1 | 3/2005 | Bakalash et al. |
| 2005/0071807 | A1 | 3/2005 | Yanavi |
| 2005/0081206 | A1 | 4/2005 | Armstrong et al. |
| 2005/0125777 | A1 | 6/2005 | Calder et al. |
| 2005/0131924 | A1 | 6/2005 | Jones |
| 2005/0182750 | A1 | 8/2005 | Krishna et al. |
| 2005/0183143 | A1 | 8/2005 | Anderholm et al. |
| 2005/0278290 | A1 | 12/2005 | Bruce et al. |
| 2005/0278378 | A1 | 12/2005 | Frank |
| 2006/0075399 | A1 | 4/2006 | Loh et al. |
| 2006/0106793 | A1 | 5/2006 | Liang |
| 2006/0116981 | A1 | 6/2006 | Krimmel et al. |
| 2006/0174346 | A1 | 8/2006 | Carroll et al. |
| 2006/0218138 | A1 | 9/2006 | Weare |
| 2006/0242636 | A1 | 10/2006 | Chilimbi et al. |
| 2006/0242638 | A1 | 10/2006 | Lew et al. |
| 2006/0259981 | A1 | 11/2006 | Ben-Shoshan |
| 2006/0287993 | A1 | 12/2006 | Yao et al. |
| 2007/0016672 | A1 | 1/2007 | Wilson et al. |
| 2007/0033201 | A1 | 2/2007 | Stienhans |
| 2007/0038974 | A1 | 2/2007 | Albahari et al. |
| 2007/0038983 | A1 | 2/2007 | Stienhans |
| 2007/0039009 | A1 | 2/2007 | Collazo |
| 2007/0101311 | A1 | 5/2007 | Castelli et al. |
| 2007/0233628 | A1 | 10/2007 | Sherwood et al. |
| 2008/0127120 | A1 | 5/2008 | Kosche et al. |
| 2008/0312899 | A1 | 12/2008 | Li et al. |
| 2008/0313149 | A1 | 12/2008 | Li et al. |
| 2008/0313184 | A1 | 12/2008 | Li et al. |
| 2008/0313213 | A1 | 12/2008 | Zhang et al. |
| 2008/0313507 | A1 | 12/2008 | Mahmud et al. |
| 2008/0313617 | A1 | 12/2008 | Zhu et al. |
| 2008/0313633 | A1 | 12/2008 | Zhu et al. |

FOREIGN PATENT DOCUMENTS

| | | |
|---|---|---|
| KR | 1020030022663 A | 3/2004 |
| KR | 1020040085041 A | 10/2004 |
| WO | 0075814 | 12/2000 |
| WO | 0175678 | 10/2001 |

OTHER PUBLICATIONS

"Usage Analytics for Rich Internet Applications (RIA)", Cambridge, MA, 2006.

Non-Final Office Action dated Aug. 6, 2009 in U.S. Appl. No. 11/818,600.

Notice of Allowance dated Feb. 17, 2010 in U.S. Appl. No. 11/818,600.

Bowring et al., "Monitoring Deployed Software Using Software Tomography", 2002, ACM Press, NY, USA, 8 pages.

Corbett et al., "Bandera: Extracting Finite state Models from Java Source Code", 2000, Proceedings of the 22nd Intl. Conference on Software Engineering, pp. 439-448.

Donnell, Jack, "Java* Performance profiling using the VTune™ Performance Analyzer" 2004, White Pater, Intel, 8 pages.

Farina et al, "Representing Software Usage Models with Stochaistic Automata Networks", Jul. 15-19, 2002, SEKE '02, pp. 401-407.

Fischer, "User Modeling in Human-Computer Interaction", 2001, User Modeling and User-Adapted Interaction 11. pp. 65-86.

Gokhaie et al., "Software Reliability Analysis Incorporating Fault Detection and Debugging Activities", Nov. 1998, The 9th International Symposium on Software Reliability Engineering, 10 pages.

Intel® VTune™ Performance Analyzer 7.2,2005,3 pages.

Jiawei et al., "Stream Cube: An Architecture for Multi-Dimensional Analysis of Data Streams", 2005, Distributed and Parallel Databases, v. 18, pp. 173-197.

Li, Xiaolei, et al., "High-Dimensional OLAP: A Minimal Cubing Approach", 2004, Proceedings of the 30th VLDB Conference, pp. 528-539.

Li, Xiaoming, et al., "Analyzing the Uses ofa Software Modeling Tool", 2006, LDTA, pp. 1-18.

Linton et al., "Building User and Expert Models by Long-Term Observation of Application Usage", 1999, Proceedings of the 7th Intl. conference on User Modeling, pp. 129-138.

Nagappan et al., "Towards a Metric Suite for Early Software Reliability Assessment", 2003, Fast Abstract at the International Symposium on Software Reliability Engineering (ISSRE) 2003, Denver, CO., 2 pages.

Neal et al., "Playback: A Method for Evaluating the Usability of Software and Its Documentation", Dec. 1983, CHI '83 Proceedings, pp. 78-82.

Titzer et al., "Nonintrusive Precision Instrumentation of Microcontroller Software", Jul. 2005, ACM SIGPLAN Notices, vol. 40, Issue 7, pp. 59-68.

Rosenberg, et al., "Software metrics and reliability", Nov. 1998, 9th International Symposium on Software Reliability, Germany, 8 pages.

Puerta, Angel et al., "XIML: A Common Representation for Interaction Data", IUP02, Jan. 13-16, 2002, pp. 214-215.

PCT International Search Report cited in related PCT Application No. PCT\US2008\067054, dated Oct. 31, 2008.

U.S. Notice of Allowance/Allowability from U.S. Appl. No. 11/818,607 dated May 25, 2010.

Supplemental Notice of Allowability from U.S. Appl. No. 11/818,610 dated Feb. 5, 2010.

Supplemental Notice of Allowability from U.S. Appl. No. 11/818,600 dated Apr. 12, 2010.

Intel, VTune™ Performance Analyzer 8.1 for Linux Getting Started Guide, 2006.

Intel, VTune™ Performance Analyzer 8.0 for Windows, 2006.

Non-Final Office Action dated Jul. 24, 2009 in U.S. Appl. No. 11/818,596.

Notice of Allowance dated Dec. 17, 2009 in U.S. Appl. No. 11/818,596.

Non-Final Office Action dated Aug. 6, 2009 in U.S. Appl. No. 11/818,610.

Notice of Allowance dated Jan. 13, 2010 in U.S. Appl. No. 11/818,610.

Non-Final Office Action dated Oct. 5, 2009 in U.S. Appl. No. 11/818,612.

Notice of Allowance dated Dec. 22, 2009 in U.S. Appl. No. 11/818,612.

Non-Final Office Action dated Oct. 7, 2009 in U.S. Appl. No. 11/818,607.

Notice of Allowance dated Apr. 6, 2010 in U.S. Appl. No. 11/818,607.

"Multi-dimensional Approach to Indexing XML Data", Michal Kratky, PhD. Thesis, Department of Computer Science, Technical University of Ostrava, Czech Republic, 2004, 146 pgs.

"Inverted Space Storage Organization for Persistent Data of Very High Dimensionality", Ratko Orlandic and Buynggu Yu, International Conference on Information Technology: coding and Computing (ITCC '01), 2001, 6 pgs.

"Third-Parth Usage Profiling: a Model for Optimizing the Mass-Marketed Software Industry", Jeffrey Voas, Reliable Software Technologies, Sterling, VA, 2000, 9 pgs.

* cited by examiner

EFFICIENT DATA INFRASTRUCTURE FOR HIGH DIMENSIONAL DATA ANALYSIS

CROSS-REFERENCE TO RELATED APPLICATIONS

The present application is related to the following U.S. patent applications, assigned to the assignee of the present application, filed concurrently herewith and hereby incorporated by reference:

Analyzing Software Users with Instrumentation Data and User Group Modeling and Analysis, U.S. patent application Ser. No. 11/818,610;

Software Reliability Analysis Using Alerts, Asserts, and User Interface Controls, U.S. patent application Ser. No. 11/818,612;

Multidimensional Analysis Tool for High Dimensional Data, U.S. patent application Ser. No. 11/818,607;

Software Feature Usage Analysis and Reporting, U.S. patent application Ser. No. 11/818,600;

Software Feature Modeling and Recognition, U.S. patent application Ser. No. 11/818,596; and Analyzing Software Usage with Instrumentation Data, U.S. patent application Ser. No. 11/818,611.

BACKGROUND

To resolve many business-related questions, a tool referred to as multidimensional analysis is used, which in SQL terms is a 'group by' operation. Generally for one query, a large amount of data is involved, whereby performance of the analysis is critical to obtain the results; for example, users cannot wait several hours to get analysis results.

Current OLAP (Online Analytical Processing) systems enhance the performance by pre-computing data cubes that correspond to the multidimensional arrangement of the data to be analyzed. More particularly, in OLAP, a dimension is a category of data represented in one column of a table, and a measure represents data in the table that can be accessed by specifying values for its dimensions. A set of measures having the same dimensions may be represented as an OLAP cube.

However, as the number of dimensions increases, the storage required for data cubes grows exponentially. As a result of this limitation, one cube can only support tens of dimensions. In certain types of analysis, for one query, the user can choose from thousands of dimensions, whereby OLAP is inadequate. The organization of such large amounts of data has a significant impact on the system performance.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which source data arranged as a data structure of record identifiers and dimensions of data values are processed into a file model for efficient access. At least one file is constructed as an inverted index corresponding to any selected dimension, with the file built by mapping data from raw dimension values to mapped values based on mapping entries in a dimension table. The record identifiers are arranged into subgroups within a record identifier data structure of the inverted index based on each record identifier's corresponding mapped value in the dimension table. A count and/or an offset may be maintained, e.g., as a separate file of the inverted index, for locating each of the subgroups within the record identifier data structure.

The raw values for a dimension are maintained within a raw value file, with the raw values arranged in an order corresponding to an ordering of the record identifiers. The raw value file may be compressed by excluding at least some raw values from the raw value file; for example, for sparse data with many data values being null, nulls may be excluded, with a record identifier associated with each non-null raw value in the raw value file.

In one implementation a data importer and processing mechanism is coupled to a data source containing data corresponding to rows of record identifiers by columns of dimensions. The data importer and processing mechanism writes files containing information corresponding to the data, including a raw value file by which raw values for a dimension can be located, and constructs an inverted index file containing subgroups of one or more record identifiers, each subgroup defined by a mapping value based on the raw value associated with each record identifier of that subgroup. A data manager provides access to data in the data files, such as by offering various functions. Caching may be used for efficient access.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a data model that organizes high dimensional data. To this end, examples are described in which the data model is file based and organizes high dimensional data by columns. An inverted index along with inverted index-based operations are provided to facilitate fast data retrieval. Also described is a cache and cache-based operations to enhance data access performance, and compression to reduce the storage size for sparse data.

For purposes of description, various examples herein are directed towards software quality metrics (SQM) data, which is generally data that was recorded during usage sessions of software products and is very high dimensional, e.g., SQM data may have many thousands of dimensions. However, as will be understood, these are only non-limiting examples, as the technology generally applies to computation (e.g., online) for multidimensional analysis of high dimensional data, regardless of the data type, as well as inverted index and caching for enhancing the performance of multidimensional analysis.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
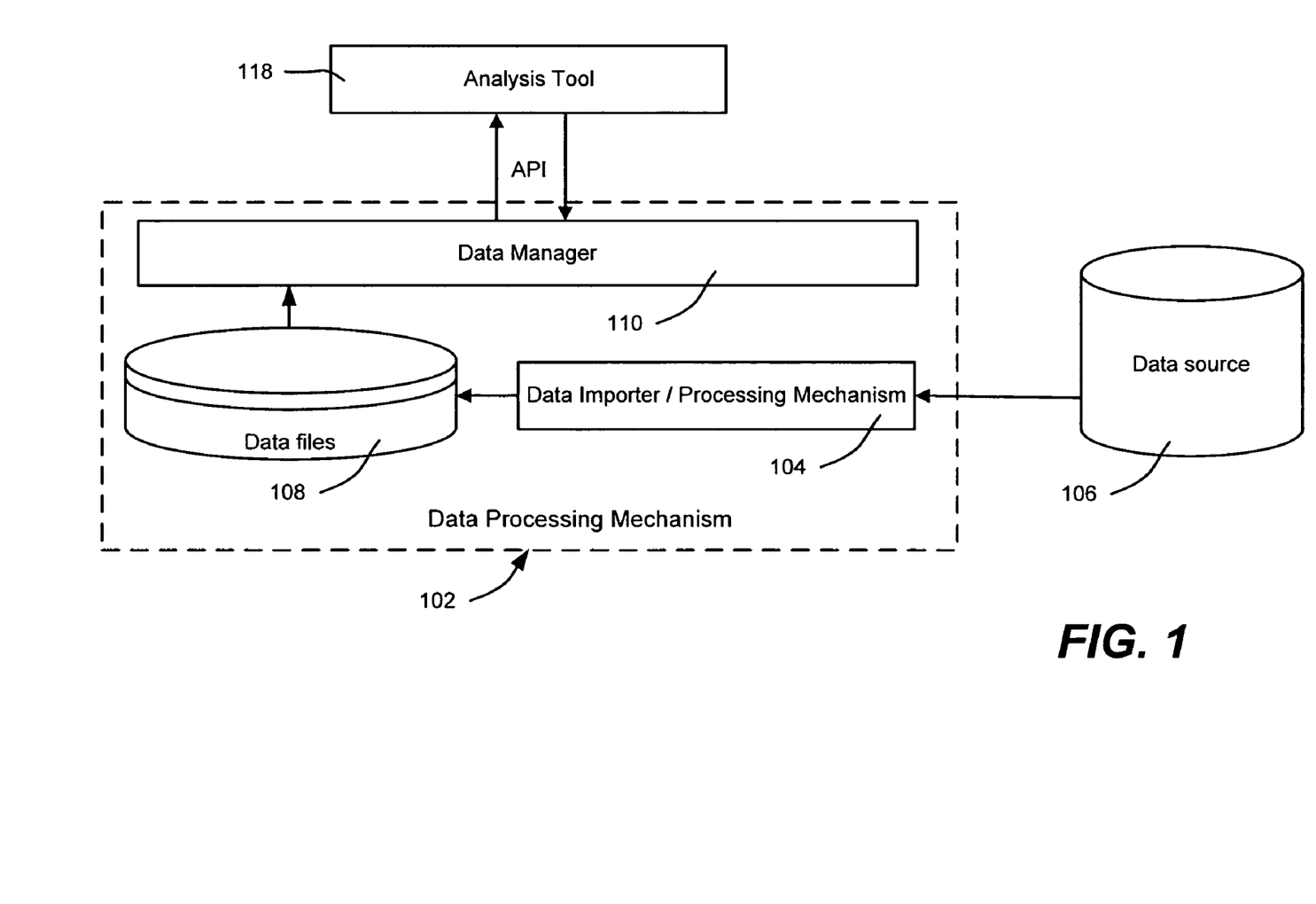
FIG. 1 shows an example representation of a data processing mechanism that provides data for analyzing.

Turning to FIG. 1, there is shown a data processing mechanism 102 that via a data importer/processor 104 converts a source of data (e.g., SQM data) 106 into a set of data files 108. To this end, when the original data is in some source such as a database, the data importer/processor component 104 pulls the data from the data source 106 and converts the data into data files 108 arranged for efficient data retrieval, as set forth below.

A data manager 110 such as part of a service provides access to the data in the data files, and/or to the data files 108 themselves, such as via APIs. In general, the data manager 110 manages the data and indices to provide a highly efficient data access interface for higher level system components. For example, an analysis tool 118 such as described in the aforementioned U.S. patent applications entitled "Multidimensional Analysis Tool for High Dimensional Data" and "Analyzing Software Usage with Instrumentation Data" may request data via the APIs for analysis and data reporting.

As can be readily appreciated, the data manager 110 may simply provide access to the data and/or data files, or alternatively can provide at least some functionality. For example, in one implementation, for a given dimension, the APIs provide a function to get the raw values of specified rows, a function to get the mapped values of specified rows, a function to get the rows of specified raw values, a function to get the rows of specified mapped values, a function to get a mapped value dictionary, or a functions to get a row count. Other functionality such as filtering, grouping, sorting and so forth may be provided by the data manager 110, but alternatively may be secondarily processed from the retrieved data.

Figure 2:
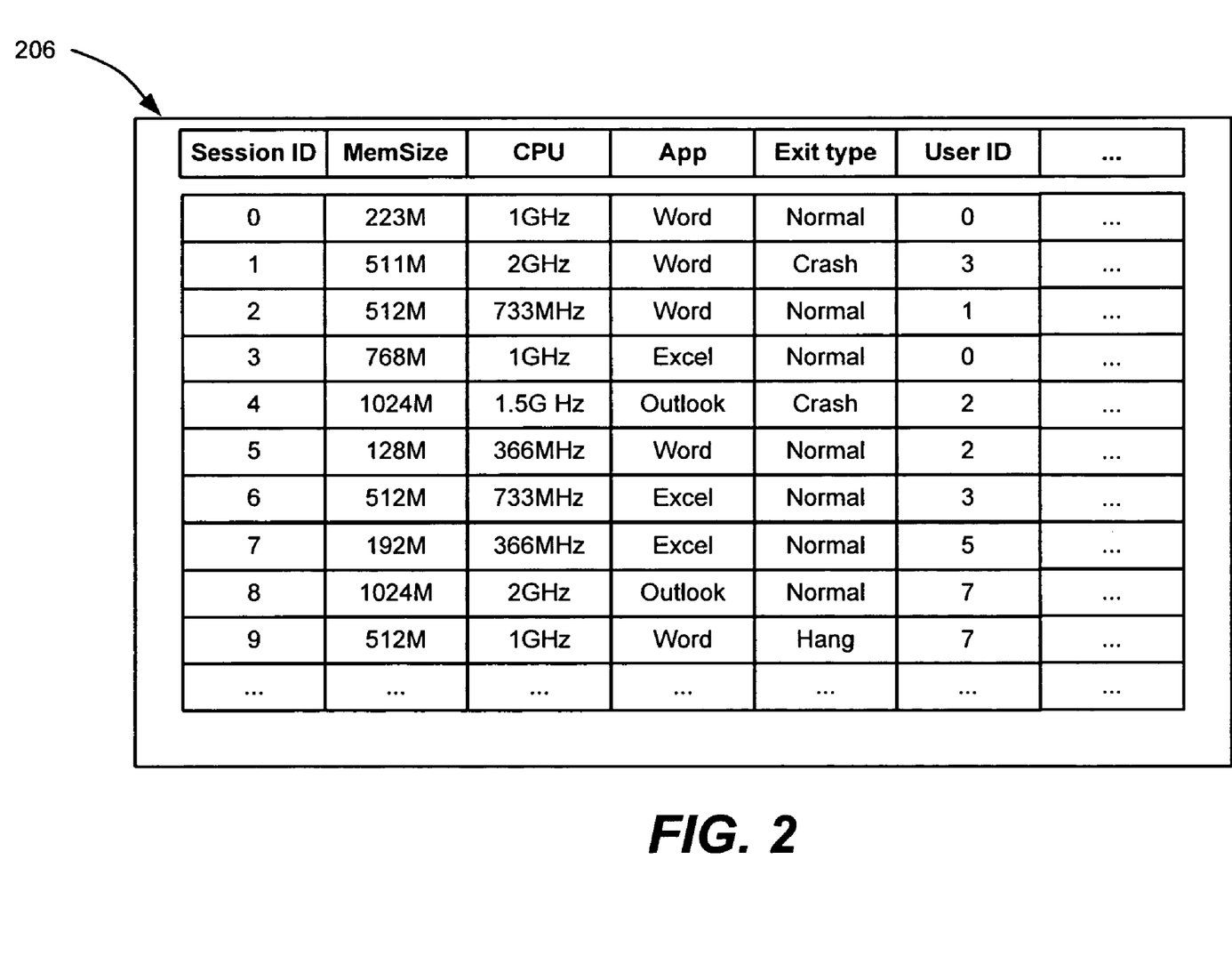
FIG. 2 shows a representation of example high-dimensional data in the form of a table of software instrumentation (e.g., software quality metrics, or SQM) data saved for various program usage sessions by users of a suite of application programs.

FIG. 2 provides an example of instrumentation data 206, with some of the collected data (arranged in columns) for some number of program usage sessions (arranged in rows). In general, the example instrumentation data 206 comprise data collected from each user session, where a session corresponds to actual usage by a user of an executing program. A session starts from the application start, and ends when the application is closed or otherwise terminated. Sessions can also be time limited, e.g., if a session exceeds twenty-four hours, the session is ended and the instrumentation data recorded (the application continues to run). In SQM, each record corresponds to one session, which is the period of a single run of a software program under evaluation, e.g., a software application program of the Microsoft® Office suite of software programs.

In one example implementation, each session is associated with some or all of the information shown in FIG. 2, including a session ID, a user ID, and an application name. Other information that is typically recorded includes the application version, a start time, an end time, the commands used during the session and still other data, such as the number of files opened and so forth.

Conceptually the data can be viewed as a (very large) table, in which each row represents a record and each column represents a dimension, where there could be thousands of dimensions. In the example below, the data recorded in a session include memory size, CPU speed, application name, and so forth. In one system, the data is organized by column, with inverted indices built for high retrieval performance.

The technology described herein is generally directed towards an efficient data infrastructure that supports a multidimensional analysis of high dimensional data. As will be understood, this facilitates fast data retrieval ability for each dimension. In one configuration, a file-based data model is used to organize the high dimensional data by columns, and an inverted index-based method is provided to optimize column retrieval. Other system components such as an analysis/report generation tool can then efficiently access the data via the data manager APIs. Note that in general, pre-computation of the files cannot be performed, because there are too many potential results to be pre-computed. As such, an infrastructure and computation model is provided that may be used in an online fashion.

Note that in typical multidimensional data analysis scenarios, the data is read only. As a result, the performance for updating an index is not relevant, whereby the described approach is not concerned with transition processing.

Returning to FIG. 1, the data importer/processing mechanism 104 loads the raw data from the data source 106, converts the data into an efficient data model, and saves the data as files 108, such as in local storage. Via the data files 108, the data manager 110 provides fast retrieval ability for requested data; as described below with reference to FIG. 6, a cache mechanism 660 may be used for more efficiency by avoiding at least some disk random I/O operations.

Figure 3:
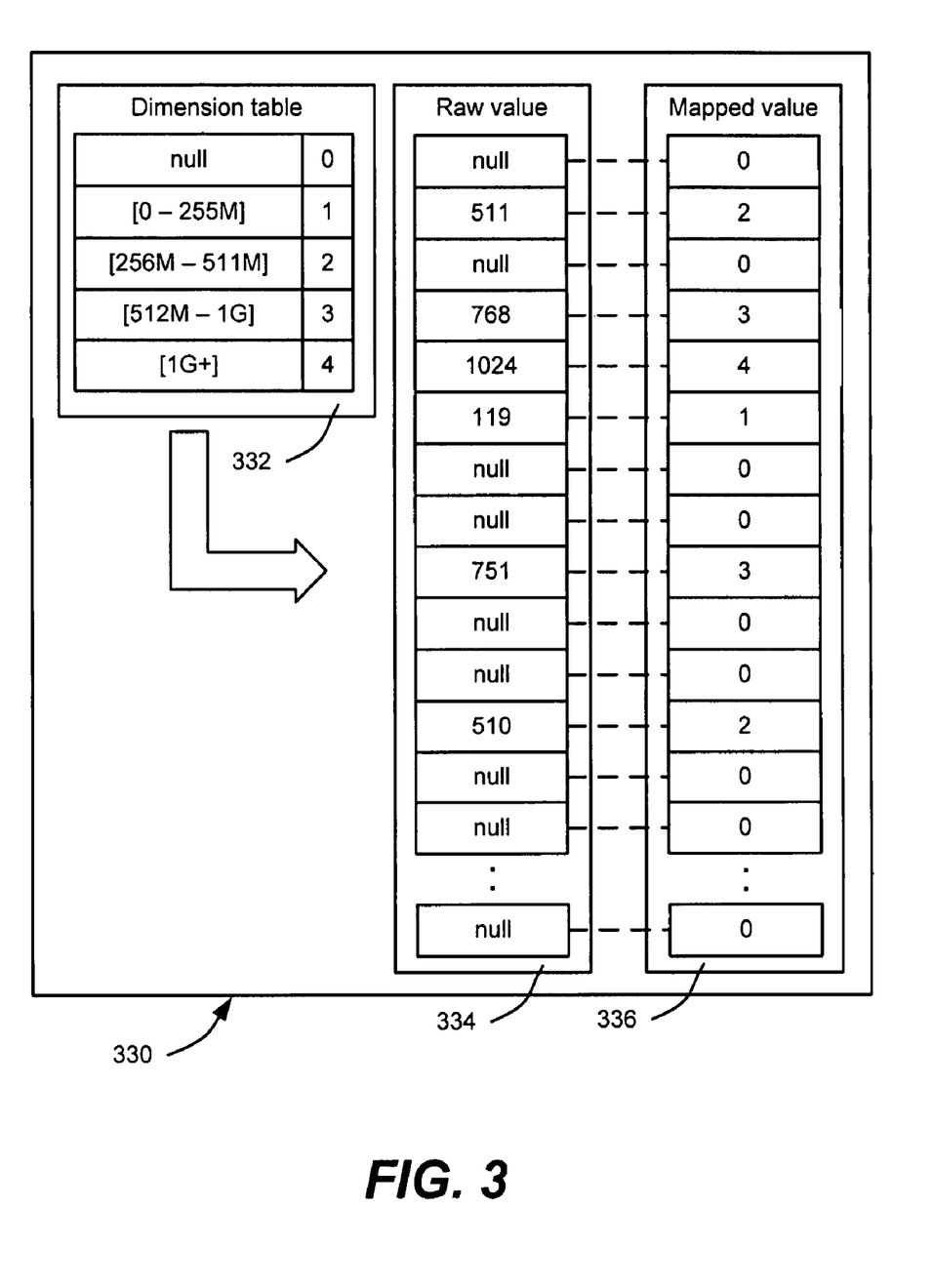
FIG. 3 shows an example representation of using a dimension table to map raw values to mapped values.

A first part of the data organization processing is represented in the block 330 of FIG. 3. In general, in block 330 the data is organized by columns, and each column corresponds to three data structures, which in this example comprise files, namely a dimension table file 332, the raw data file 334 and a mapped data file 336. The raw data file 334 is used to store the values of a column (in each row) of the source data 106, and the mapped data file 336 is used to store the mapped value for each raw value. The mapping is defined in the dimension table file 332.

In the example of FIG. 3, the dimension table 332 defines a memory size range for each mapped value. For any suitable dimension, an operator of the analysis process or the like may determine the ranges as appropriate for the desired analysis. Using the range, each raw value is mapped to a corresponding mapped value. Nulls are mapped to zero (although in a real world model, each session would ordinarily have some memory and thus few if any nulls would be present, unless not reported for some reason). Thus, using the range of 256 MB to 511 MB, it is seen in FIG. 3 that the raw value of 511 (MB) is mapped to a value of two (2), the raw value of 768 (MB) is mapped to a value of three (3) based on the range in the dimension table 312 of 512 MB to 1 GB, and so forth.

Figure 4:
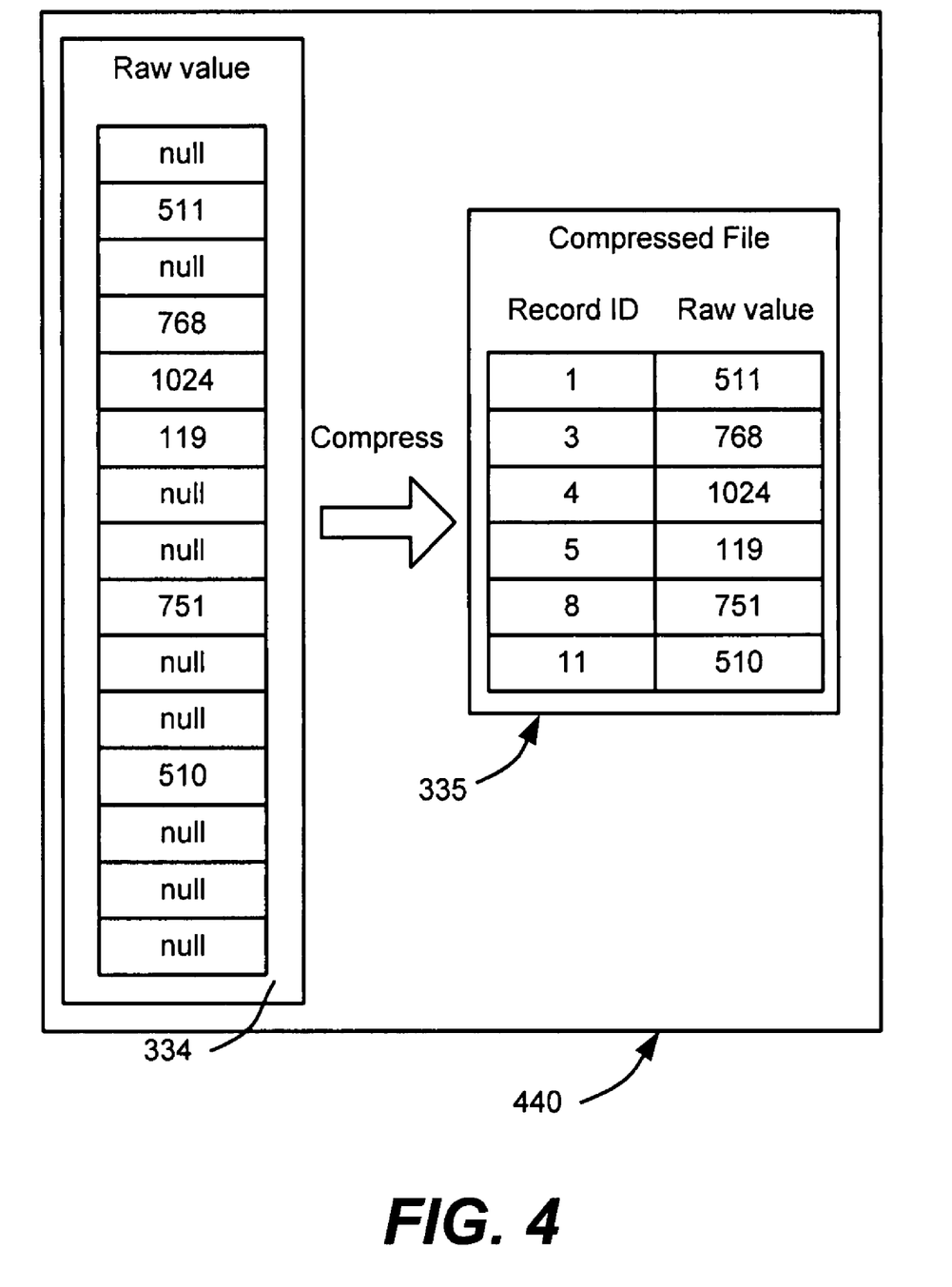
FIG. 4 shows an example representation of mapping raw values into a compressed file.

In the raw data file 334, values can be stored sequentially as vectors. However, some dimensions are relatively sparse because there are often 'null' values in the data. For such dimensions, compression techniques may be used to store the data so that the amount of required data storage can be reduced. One example is represented in the block 440 of FIG. 4, in which a compressed file 335 is built from the raw value file 334. As can be seen in the compressed file 335, only the non-null values are recorded by storing them in association with a record identifier, e.g., as RecordID, value pairs. The compressed file 335 may be used instead of the raw value file 334 when mapping; any RecordID values skipped in the compressed data file 335 are known to have a null raw value.

For efficient retrieval performance, inverted indices are built. In one implementation, for each column of data, an inverted index is built and stored into two files; one file stores the row identifiers for each mapped value, and another file stores the row count and offset in the first file for each mapped value (note that the count can be computed from the offset, or vice-versa, however maintaining the count-offset is relatively small and efficient). With the inverted index, the retrieval of records for a given mapped value is efficient, requiring only a constant time.

Figure 5:
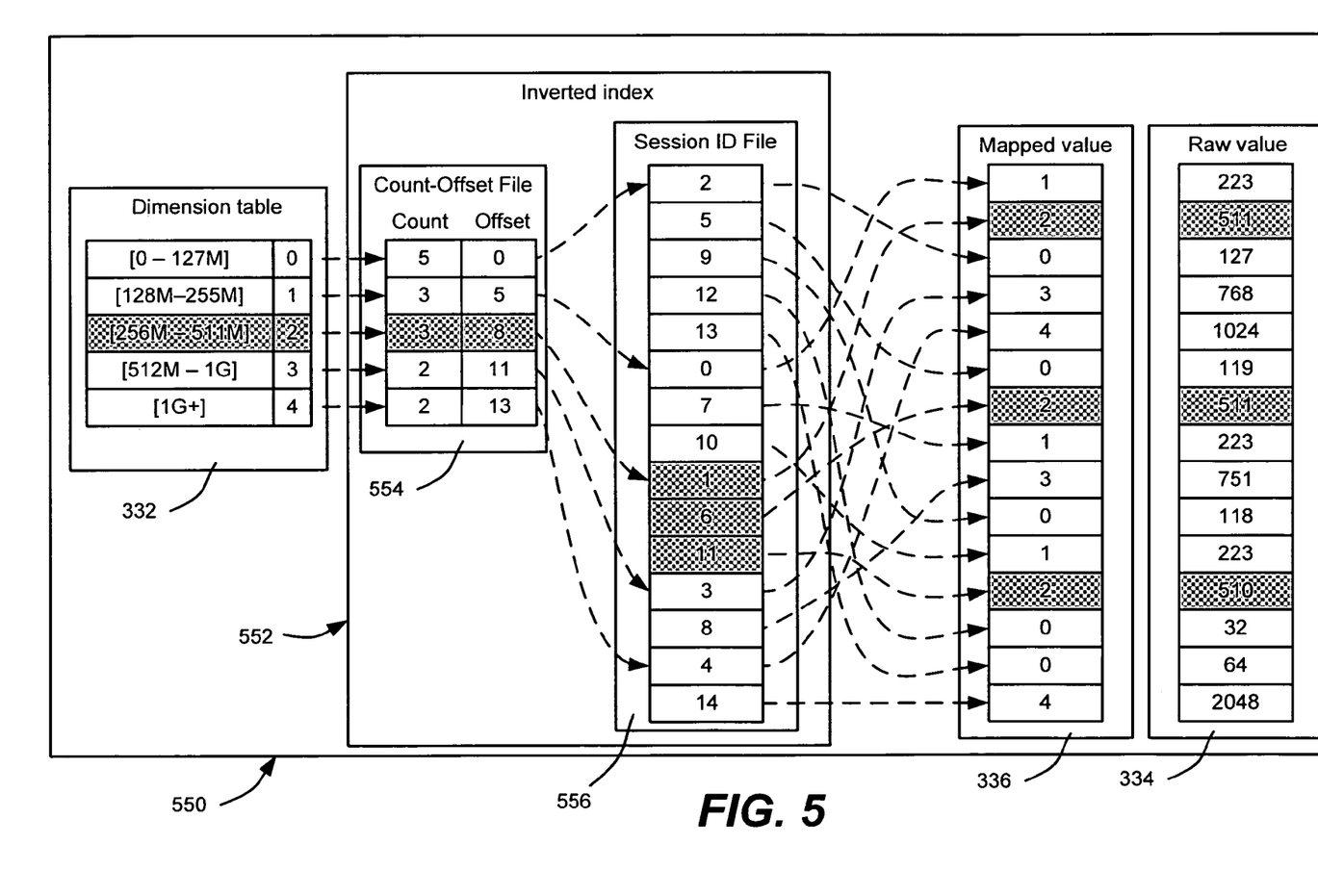
FIG. 5 shows an example representation of building an inverted index for a memory size variable recorded in a dimension.

Block 550 of FIG. 5 shows an example inverted index 552 comprising inverted index files 554 and 556 for the variable that represents the memory size ("MemSize") in the logged session SQM data. The shaded blocks show how the session ID that is set with the memory size range from 256M to 511M (mapped value 2 via the dimension table 332) is retrieved with the inverted index 552 built for the MemSize variable. As can be seen, for the range from 256M to 511M, there is a count of three (3) session ID entries, beginning at offset eight (8), namely session IDs one (1), six (6) and eleven (11). These correspond to the three mapped vales of two (2) in the mapped value file 336, which map to raw values 511, 511 and 510 in the raw value file 334. Note again that the compressed file 335 of FIG. 4 may be provided instead of the raw value file 334 wherever appropriate.

Figure 6:
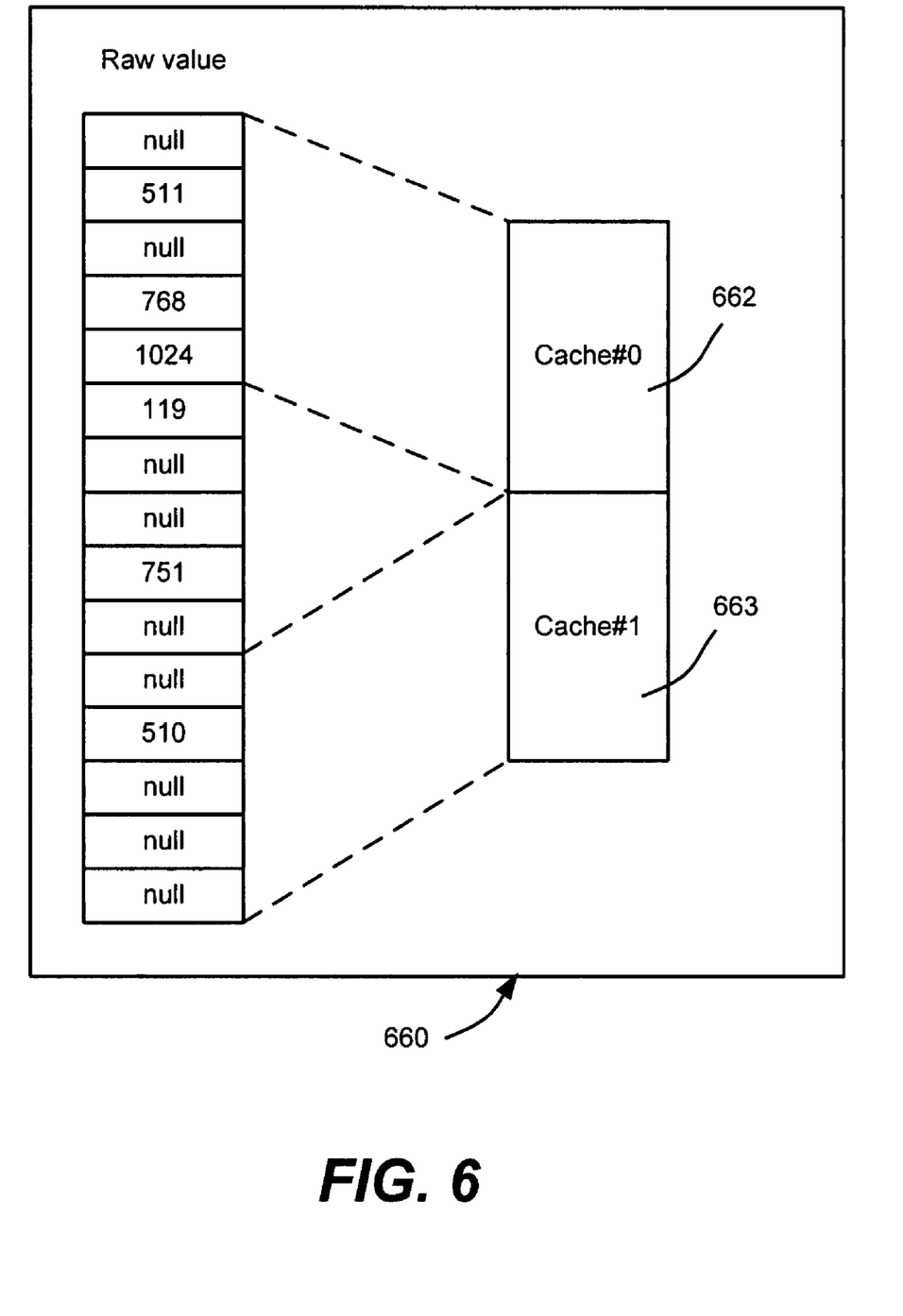
FIG. 6 shows an example representation of caching data for efficient retrieval.

In one example, caches are used by the data manager to ensure efficient performance with respect to data access. FIG. 6 shows one example implementation of a cache, in which the data block in the files are mapped into the memory and loaded to memory. More particularly, a cache mechanism 660 including one or more caches 662, 663 avoids random disk I/O operations when accessing the data file by having the data manager 110 map the row ID to a physical cache address when accessing a record. The data manager 110 also provides an efficient sequential data accessing interface, whereby the time complexity is linear relative to the amount of data requested.

Figure 7:
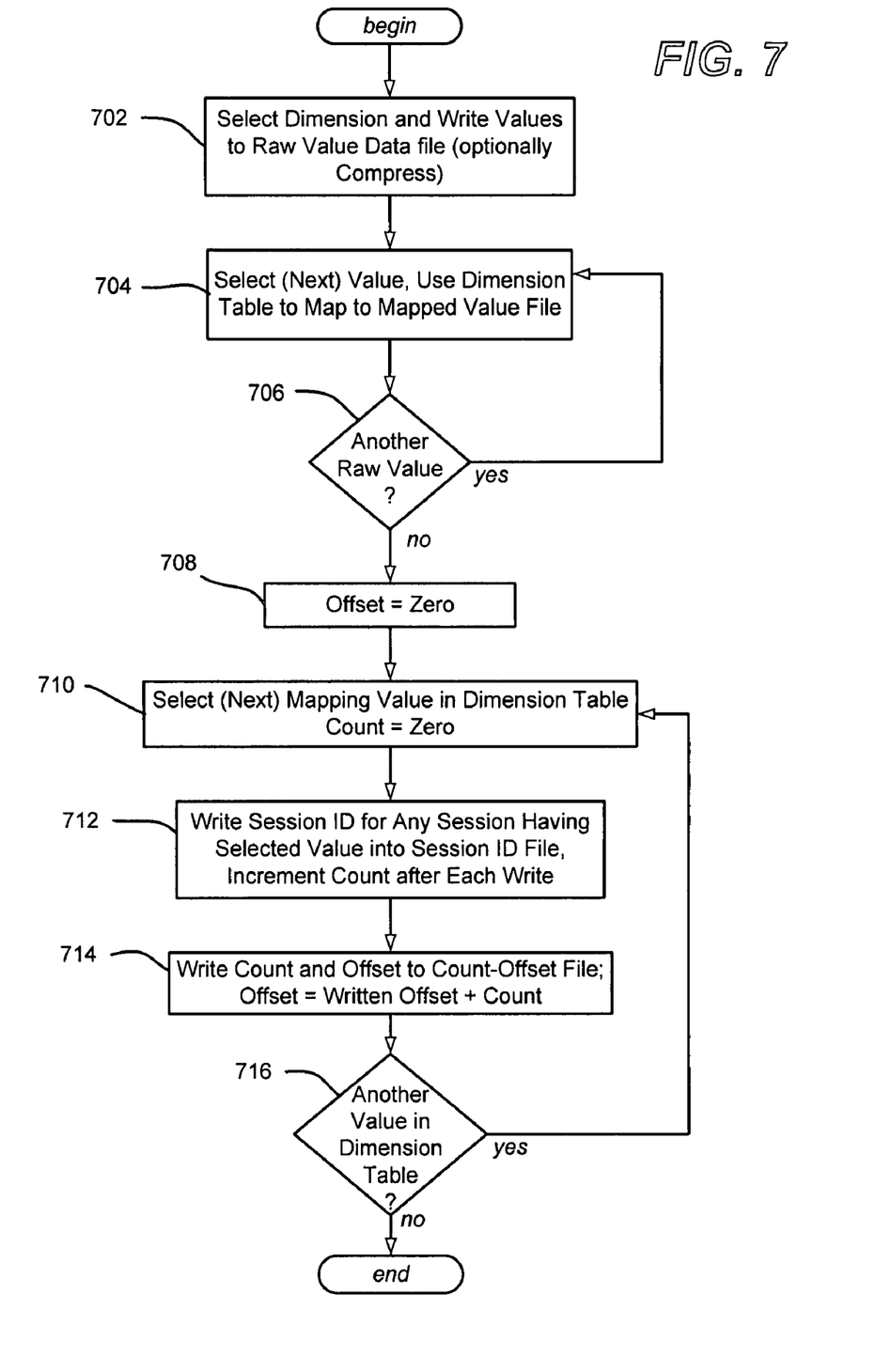
FIG. 7 is a flow diagram representing various example concepts related to processing high dimensional data.

FIG. 7 summarizes example steps taken to build the inverted index table 552 of FIG. 5 for any selected dimension, such as the memory size. Step 702 represents selecting the dimension and writing the values for each session to the raw value data file. Note that the raw file may be compressed in some lossless way, such as in the example of FIG. 4 above in which nulls are skipped over, and for non-null values the record ID (e.g., session ID) is saved in association with the raw value of the dimension.

Steps 704 and 706 represent looping through each of the raw values, and for each raw value, finding a corresponding mapping value in the dimension table to which the raw value maps. In the above memory size example, the dimension table includes mapping values based on ranges of memory, whereby each raw memory size falls into a range.

In this example, when the values have been mapped, the count-offset file and session ID file are built. To this end, step 708 zeroes the offset counter, and step 710 selects the first mapping value in the dimension table, e.g., zero (0) for nulls, and zeros the count for this particular mapping value.

Step 712 represents writing each record ID (session ID in this example) to the session ID file, and incrementing the count following each write. In the example of FIG. 5, five session IDs (2, 5, 9, 12 and 13) having mapping values of zero (0) are found and written to the session ID file, whereby thus the count is incremented to five following the five writes. Step 714 writes the count of five and the current offset value, zero in this example, to the count-offset file. Following the count and the current offset write, the offset is computed by adding the written offset value to the count.

Step 716 loops back to step 710 to repeat the process for the next mapping value in the dimension table, which is one (1) in this memory size example, representing the range of 0 MB to 255 MB of memory. As can be seen via the above steps using the example of FIG. 5, three session IDs (0, 7 and 10) are written for this range of memory, whereby the count-offset file is written with a count of three (3) and an offset of five (5). The offset is then upped to eight (8) for the next memory size range.

The process ends via step 716 when the dimension table has no further mapping values to process. Another inverted index for another dimension may be built, and/or additional processing may be performed as desired.

Exemplary Operating Environment

Figure 8:
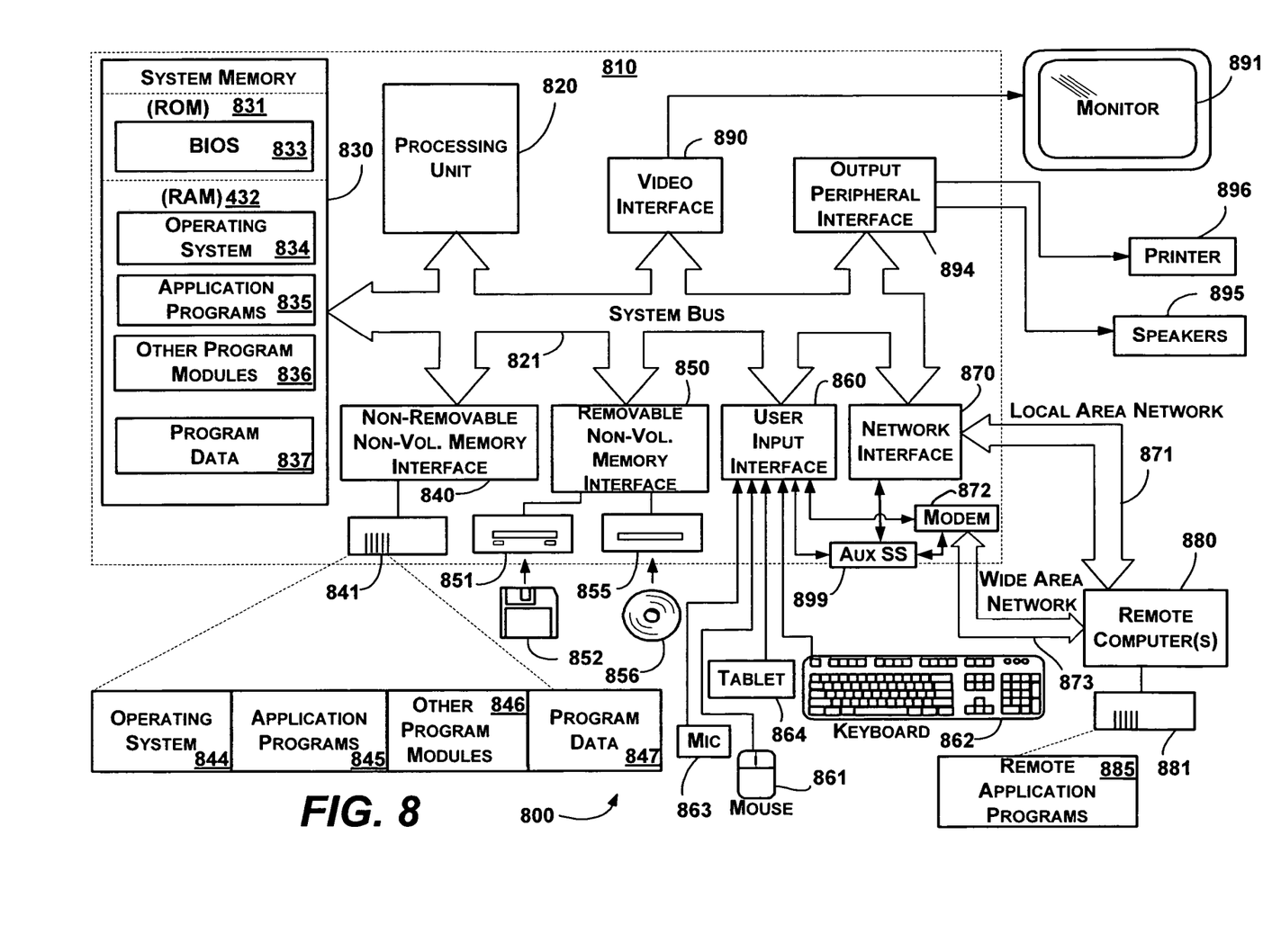
FIG. 8 is an illustrative example of a general-purpose computing environment into which various aspects of the present invention may be incorporated.

FIG. 8 illustrates an example of a suitable computing system environment 800 on which the data processing mechanism 102 of FIG. 1 may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 8, an exemplary system for implementing various aspects of the invention may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media can be any available media that can be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component 874 such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

An auxiliary subsystem 899 (e.g., for auxiliary display of content) may be connected via the user interface 860 to allow data such as program content, system status and event notifications to be provided to the user, even if the main portions of the computer system are in a low power state. The auxiliary subsystem 899 may be connected to the modem 872 and/or network interface 870 to allow communication between these systems while the main processing unit 820 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for generating an inverted index for retrieval of data from a data structure, the method comprising:
   generating a file model structure comprising a raw value data file, a mapped value file, and a dimension table, the generating comprising:
      populating the dimension table with mapped values and ranges of raw values of a dimension of a data structure, the ranges of raw values mapped to corresponding mapped values; and
      for raw values within the dimension of the data structure:
         populating the raw value data file with a raw value of the dimension; and
         populating the mapped value file with a mapped value corresponding to the raw value within the raw value data file based upon a mapping within the dimension table; and
   generating an inverted index comprising a recordID file and a Count-Offset file, the generating comprising:
      for mapped values within the dimension table:
         populating the recordID file with one or more record identifiers associated with a raw value mapped to a mapped value by falling within a range of raw values within the dimension table; and
         populating the Count-Offset file with a count value and an offset value of the mapped value based upon the populating of the recordID file.

2. The method of claim 1, the populating the Count-Offset file comprising:
   computing a count value and an offset value for locating one or more record identifiers within the recordID file based upon the one or more record identifiers falling within a range of raw values as specified by the dimension table.

3. The method of claim 1, the populating the recordID file comprising:
   arranging the record identifiers within the recordID file based upon record identifiers falling within ranges of raw values as specified by the dimension table.

4. The method of claim 1, the populating the raw value data file comprising:
   maintaining the raw values within the raw value file, with the raw values arranged in an order corresponding to an ordering of the record identifiers within the recordID file.

5. The method of claim 1, the populating the raw value data file comprising:
   compressing the raw values by excluding one or more raw values from the raw value file.

6. The method of claim 5, the compressing comprising:
   excluding raw values having null values; and
   associating record identifiers with non-null raw values in the raw value file.

7. The method of claim 1, comprising:
   mapping record identifiers within the recordID file to physical cache addresses when accessing a record of the data structure.

8. The method of claim 1, comprising:
   providing access to the raw value file and inverted index for use in analyzing high dimensional data within the data structure.

9. A system for generating an inverted index for retrieval of data from a data structure, the system comprising:
   a data importer and processing mechanism coupled to database and configured to: generate a file model structure comprising:
      a dimension table comprising mapped values and ranges of raw values of a dimension of a data structure, the ranges of raw values mapped to corresponding mapped value;
      a raw value file comprising raw values of the dimension; and a mapped value file comprising mapped values corresponding to the raw values within the raw value data file based upon a mapping within the dimension table; and
   generate an inverted index comprising:
      a recordID file comprising record identifiers associated with raw values mapped to mapped values by falling within a range of raw values within the dimension table; and
      a Count-Offset file comprising count values and offset values defining the location of particular record identifiers within the recordID file.

10. The system of claim 9, comprising:
    a data manager configured to provide access to data within the data structure using the file model structure and the inverted index.

11. The system of claim 10, wherein the data comprises software quality metrics data having session identifiers as record identifiers and dimension values arranged in a column for respective dimensions within the data structure.

12. The system of claim 9, the data importer configured to:
    compress the raw value file by excluding one or more raw values from the raw value file; and
    maintain information associated with the raw value file that indicates which raw values were excluded.

13. The system of claim 9, the data importer configured to:
    compute a count value and an offset value for locating one or more record identifiers within the recordID file based upon the one or more record identifiers falling within a range of raw values as specified by the dimension table.

14. The system of claim 9, the data importer configured to:
    maintain the raw values within the raw value file, with the raw values arranged in an order corresponding to an ordering of the record identifiers within the recordID file.

15. A method for generating an inverted index for retrieval of data from a data structure comprising record identifiers and one or more dimensions, a dimension comprising one or more raw values, the method comprising:
    generating an inverted index comprising a recordID file and a Count-Offset file, the generating comprising:
       for mapped values within a dimension table comprising mapped values mapped to ranges of raw values of a dimension:
          populating the recordID file with one or more record identifiers associated with a raw value mapped to a mapped value by falling within a range of raw values within the dimension table; and populating the Count-Offset file with a count value and an offset value of the mapped value based upon the populating of the recordID file.

16. The method of claim 15, the populating the Count-Offset file comprising:

computing a count value and an offset value for locating one or more record identifiers within the recordID file based upon the one or more record identifiers falling within a range of raw values as specified by the dimension table.

17. The method of claim 15, the populating the recordID file comprising:

arranging the record identifiers within the recordID file based upon record identifiers falling within ranges of raw values as specified by the dimension table.

18. The method of claim 15, comprising:

maintaining the raw values within the raw value file, with the raw values arranged in an order corresponding to an ordering of the record identifiers within the recordID file.

19. The method of claim 15, comprising:

maintaining the mapped values within a mapped value file.

20. The method of claim 15, comprising:

maintaining the dimension table with mapped values corresponding to ranges of raw value.

* * * * *